United States Patent [19]

Kasamura et al.

[11] Patent Number: 4,777,498

[45] Date of Patent: Oct. 11, 1988

[54] IMAGE FORMING APPARATUS

[75] Inventors: Toshirou Kasamura, Yokohama; Takashi Ozawa, Ichikawa; Yasuyoshi Yamamoto, Tokyo; Masashi Ohashi, Tokyo; Akiyoshi Kimura, Tokyo; Nobukazu Sasaki, Tokyo; Michiro Koike, Kawasaki; Atsushi Kubota, Machida; Tatsuya Shiratori, Yokohama; Toshihiko Kusumoto, Tokyo, all of Japan

[73] Assignee: Canon Kabushiki Kaisha, Tokyo, Japan

[21] Appl. No.: 860,323

[22] Filed: May 6, 1986

[30] Foreign Application Priority Data

May 14, 1985 [JP] Japan ................................ 60-102448
May 14, 1985 [JP] Japan ................................ 60-102449

[51] Int. Cl.[4] ................................ G01D 15/00
[52] U.S. Cl. ................................ 346/150; 346/134
[58] Field of Search .................. 346/160.61, 134, 150; 355/3 SH, 14 SH, 4, 24; 400/624, 625, 642; 271/3.1

[56] References Cited

U.S. PATENT DOCUMENTS

| | | | |
|---|---|---|---|
| 3,227,444 | 1/1966 | Egan | 271/65 |
| 3,615,129 | 8/1968 | Drawe et al. | 355/3 |
| 3,672,765 | 6/1972 | Altman | 355/24 |
| 3,869,202 | 3/1975 | Tabata et al. | 355/3 |
| 3,999,852 | 12/1976 | Katayama et al. | 355/26 |
| 4,218,128 | 8/1980 | Satomi et al. | 355/14 SH |
| 4,453,819 | 6/1984 | Wada et al. | 355/3 SH |
| 4,537,497 | 8/1985 | Masuda | 355/14 R |
| 4,660,963 | 4/1987 | Stemmle | 355/24 |

FOREIGN PATENT DOCUMENTS

| | | |
|---|---|---|
| 1940284 | 3/1970 | Fed. Rep. of Germany . |
| 3247142 | 7/1983 | Fed. Rep. of Germany . |
| 57-186108 | 11/1982 | Japan . |
| 58-111955 | 7/1983 | Japan . |
| 59-15266 | 4/1984 | Japan . |

*Primary Examiner*—Arthur G. Evans
*Attorney, Agent, or Firm*—Fitzpatrick, Cella, Harper & Scinto

[57] ABSTRACT

An image forming apparatus such as a copying apparatus and a laser beam printer, is capable of forming a superimposed image or duplex image on one sheet. The sheet which has been once subjected to the image forming operation and which is going to be subjected to another image forming operation is reintroduced into the image forming station selectively through a flow-through sheet passage or through an intermediate tray on which the transfer sheets are once stacked. A displaceable flapper is provided to direct the sheet selectively to the flow-through passage or to the intermediate tray.

45 Claims, 7 Drawing Sheets

IMAGE FORMING APPARATUS

FIELD OF THE INVENTION AND RELATED ART

The present invention relates to an image forming apparatus such as a copying machine and a laser beam printer, more particularly to an image forming apparatus capable of forming a superimposed image or duplex image on one sheet, for example.

In a conventional apparatus of this type, a sheet passage extending from an outlet of an image forming station to an inlet of the same so that the sheet on which one image is formed at the image forming station is returned through the passage with or without being inversed in its facing orientation, to the inlet of the image forming station, where the opposite or the same side of the sheet is subjected to an additional image forming operation, so that a duplex or superimposed copy can be formed.

Since, however, the apparatus is provided only with the returning passage, the image forming operation is not efficient when a plurality of superimposed or duplex reproductions are formed, although a single superimposed or duplex reproduction is to be obtained. This is because, when a plurality of superimposed or duplex reproductions are to be formed, the plural originals are interchanged on the original supporting table for each of the reproductions.

In order to improve the apparatus in this point, it is considered that an intermediate tray is disposed in the returning passage so that a plurality of the sheets having the same image are once stacked on the intermediate tray, and the sheets are refed to the image forming station one by one. The efficiency is increased when a plurality of superimposed or duplex copies are to be formed. However, the efficiency is decreased when only one superimposed or duplex reproduction is to be formed, since even in that case, the sheet is refed to the image forming station after it is once stacked on the intermediate tray.

SUMMARY OF THE INVENTION

Accordingly, it is a principal object of the present invention to provide a high speed image forming apparatus.

It is another object of the present invention to provide a high speed image forming apparatus capable of refeeding a sheet on which an image has been formed is refed to the image forming station at a high speed.

According to an embodiment of the present invention, an image forming apparatus for forming images on a sheet plural times, is provided, which comprises an image forming station for forming an image, sheet refeeding means for refeeding to the image forming station the sheet which has been subjected to the image forming operation of the image forming station, sheet stacking and feeding means for stacking the sheet which has been subjected to the image forming operation of the image forming station and refeeding the sheet toward the image forming station, and displaceable switching means for selectively introducing the sheet either to said sheet refeeding means and to said stacking means. Because of this arrangement, a plurality of sheets can be processed at high speed, and a single sheet can be processed at a high speed.

According to another embodiment of the present invention, an image forming apparatus for forming images on a sheet plural times, is provided, which comprises an image forming station for forming an image, sheet refeeding means for refeeding to said image forming station a first sheet which has been subjected to image forming operation of the image forming station, when the image forming operation is to be repeated for plural sheets, sheet stacking and feeding means for stacking the subsequent sheet which have been subjected to the image forming operation of said image forming station and refeeding the sheet toward said image forming station, when the image forming operation is to be repeated for plural sheets. Because of this, the sheet can be processed at a high speed even when plural sheets are to be processed.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
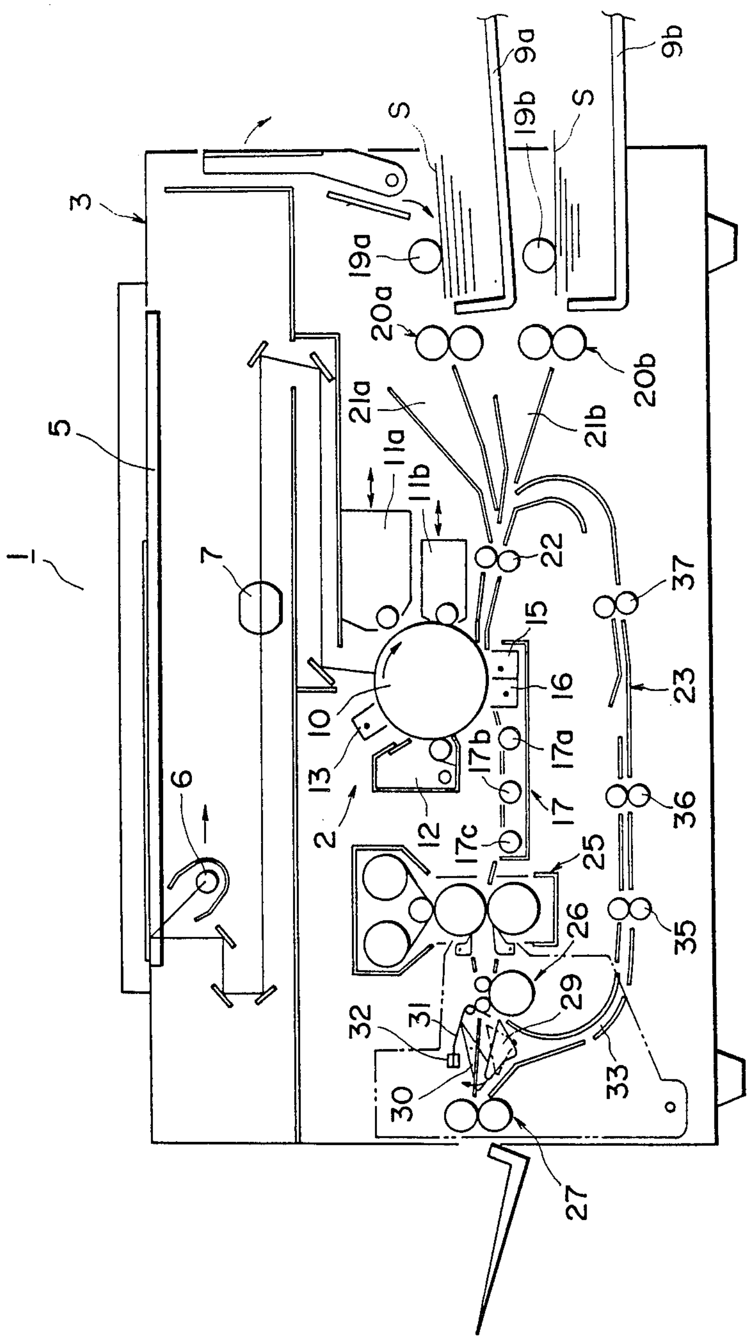
FIG. 1 is a sectional view of an image forming apparatus without an important feature of the present invention.

Referring now to FIG. 1, there is shown an image forming apparatus which does not include an important feature of the present invention.

The image forming apparatus is shown as a copying machine as an example of the image forming apparatus. The image forming apparatus 1 comprises a main frame 3 containing therein an image forming, more particularly copying, station 2. The main frame 3 is provided with an original supporting table 5, a light source 6, a lens system and two cassettes **9*a* and 9*b* and other necessary means which are known. Substantially in the center of the main frame 3, there is disposed a photosensitive member 10 in the form of a cylinder within the copying station 2. Around the photosensitive member 10, there are provided two developing devices 11*a* and 11*b* containing different color developers, a cleaning device 12, a primary charger 13, a transfer charger 15 and a separation charger 16. The transfer charger 15 is disposed adjacent an end portion of a sheet feeding device 17 having transportation rollers 17*a*, 17*b* and 17*c*. Adjacent the cassettes 9*a* and 9*b*, pick up rollers 19*a* and 19*b* are disposed. The sheet fed out from either one of the cassettes 9*a* and 9*b* is fed by an associated one of transportation rollers couples 20*a* and 20*b*** through an associated one of passages 21*a* and 21*b* to a registration roller couple 22. To the registration roller couple 22, a transfer sheet which has been subjected to an image forming operation at the copying station 2 is guided through a sheet passage 23 located below the main frame of the apparatus 3. Adjacent a trailing end of the transportation device 17, an image fixing station 25 is disposed. Downstream of the image fixing device 25, a first discharging roller couple 26 and a second discharging roller couple 27 which is usually used to discharge the sheet to an outside tray or the like. Between the first discharging roller couple 26 and the second discharging roller couple 27, a flapper 29 and auxiliary flapper 30 actuated by a solenoid 28 are disposed. The flapper 29 constitutes a part of the sheet inversing the transporting means and constitutes a part of sheet non-inversing and transporting means. Usually, the transfer sheet discharged through the first discharging roller couple 26 is conveyed above the flapper 29 taking a position indicated by the solid lines in this Figure. The auxiliary flapper 30 is swung in the direction shown by an arrow by its own transporting force. In response to the swing, a detecting arm 31 operates a photosensor 32 so as to sense the passage of the transfer sheet, while the sheet is being discharged by the second discharging roller couple 27. In a duplex copy mode operation wherein images are formed on both sides of the transfer sheet, the transfer sheet is transported halfway by the second discharging roller couple 27 in the same manner as described above, but is not discharged completely. At the time when the trailing edge portion of the transfer sheet is away from the auxiliary flapper 30, the second discharging roller couple 27 which constitutes sheet inversing and transporting means is switched to reversed rotation by operation of the detecting arm 31 and the photosensor 32. By this, the transfer sheet is directed to the passage, while being guided by the auxiliary flapper 30 and a left side of the flapper 29. Therefore, the transfer sheet is refed, in the duplex copy mode, by the second discharging roller couple 27, the flapper 29, the auxiliary flapper 30, the detecting arm 31, and photosensor 32 and the passage 33.

In a superimposed copying mode, wherein images are formed on one side of the same transfer sheet, the flapper 29 is displaced to take such a position shown in FIG. 1 by broken lines, by the operation of the solenoid 28 (control means). The transfer sheet discharged by the first discharging roller couple 26, is introduced to the passage 33 by the guiding function of the right side of the flapper 29 as seen in FIG. 1. Therefore, in the superimposed copying operation, the transfer sheet is refed by the first discharging roller couple 26, the flapper 29 and the passage 33. The transfer sheet introduced to the passage 33, is guided to the registration roller couple 22 by the transportation roller couple 35 and 36 and the sheet transporting device 37 having a lateral registration means 37 for aligning one lateral end of the transfer sheet with a reference position.

As described above, when the duplex or superimposed images are formed on the same transfer sheet, the transfer sheet which has been subjected to the operation of the image forming station 2 and the fixing station 25, is refed to the image forming station 2 by the sheet refeeding means comprising the flapper 29 or the like and the sheet transporting device 23.

Figure 2:
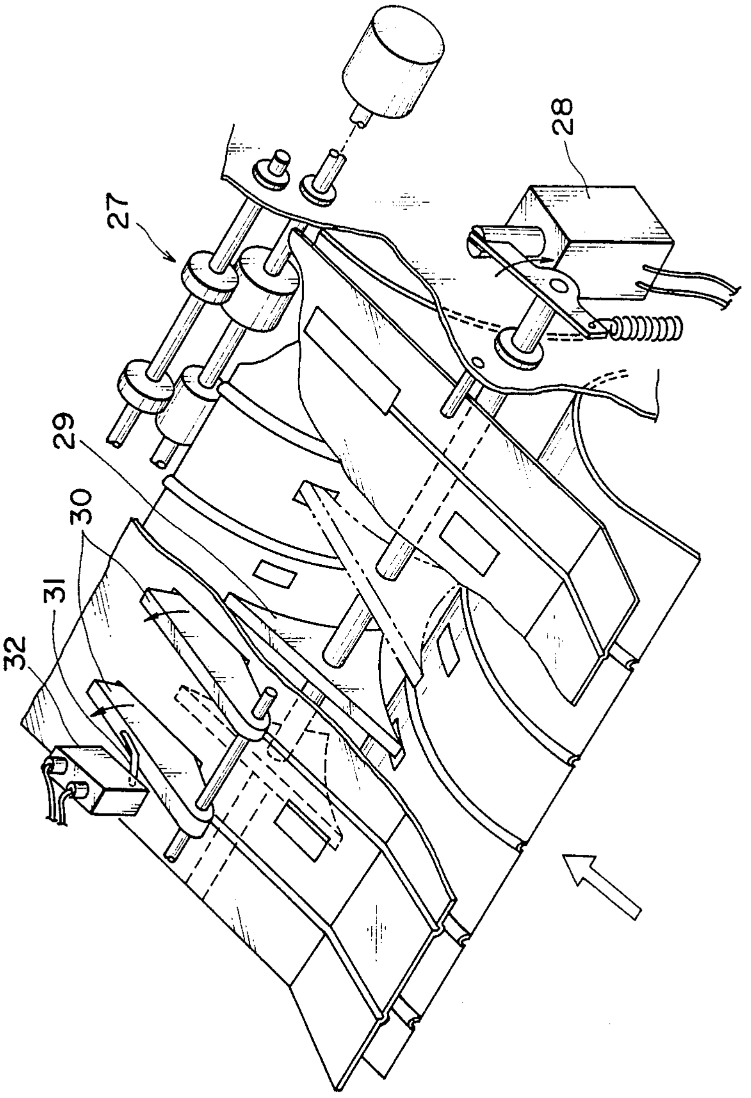
FIG. 2 is a perspective view of the major part of a sheet refeeding means.
Figure 3:
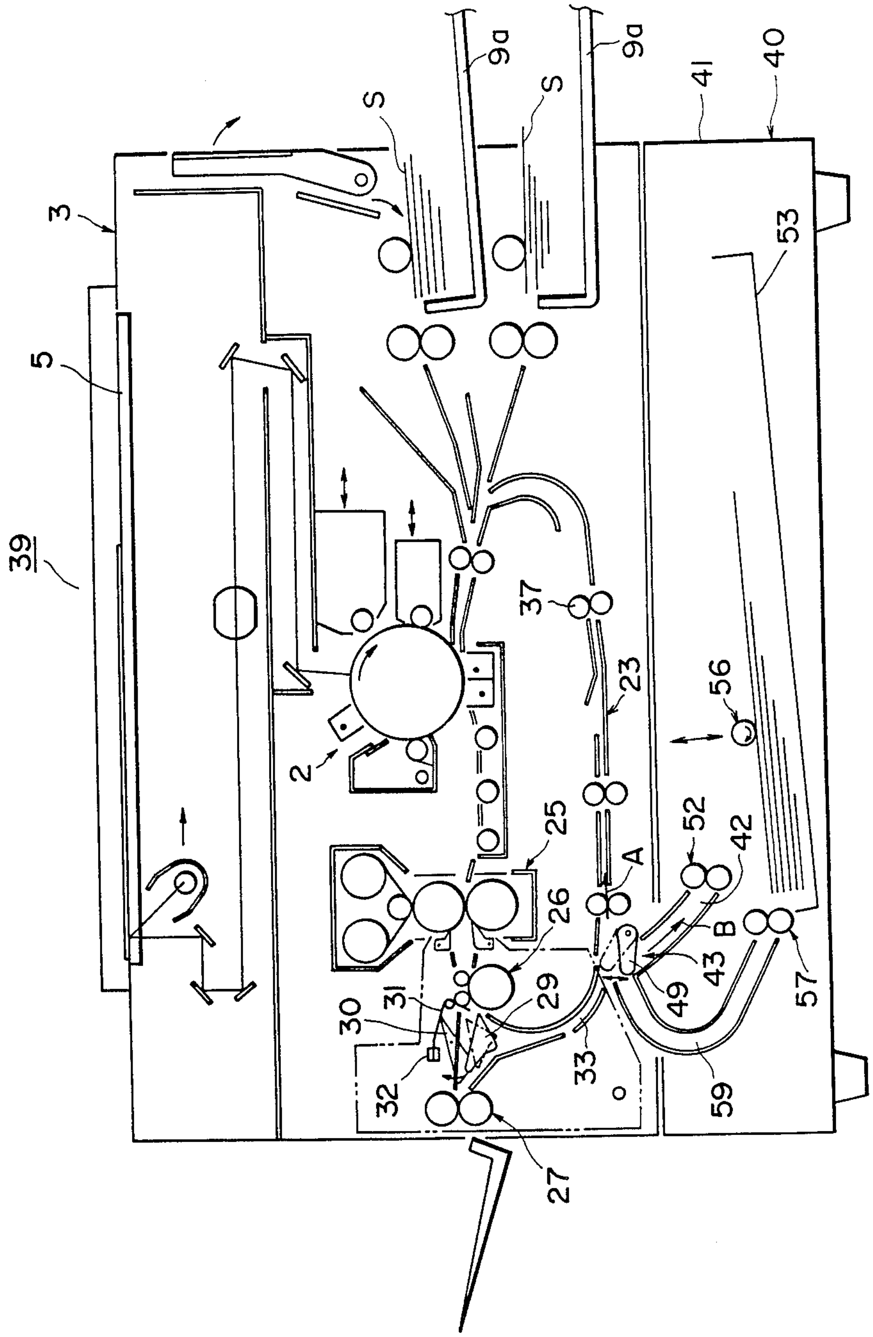
FIG. 3 is a sectional view of an image forming apparatus according to an embodiment of the present invention.

FIG. 3 is a sectional view of a copying apparatus as an example of the image forming apparatus according to an embodiment of the present invention. The copying apparatus 1 is provided with an intermediate tray 40 as a sheet stacking and transporting means, below the copying apparatus of FIG. 1. Since the structure of the copying apparatus is similar to that of FIGS. 1 and 2 with the exception of the intermediate tray 40 and the connection therewith, and therefore, the following description will be made mainly with respect to the intermediate tray 40.

Figure 4:
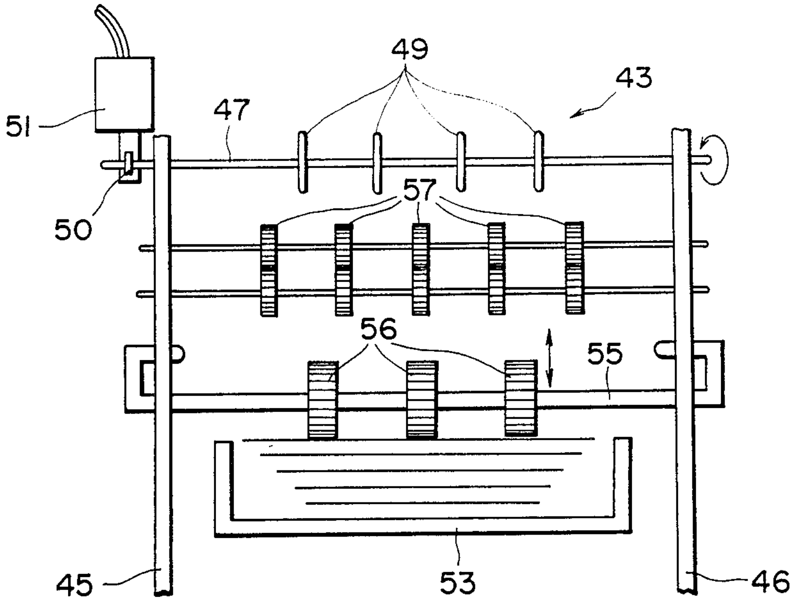
FIG. 4 is a side view of a major part of an intermediate tray.
Figure 5:
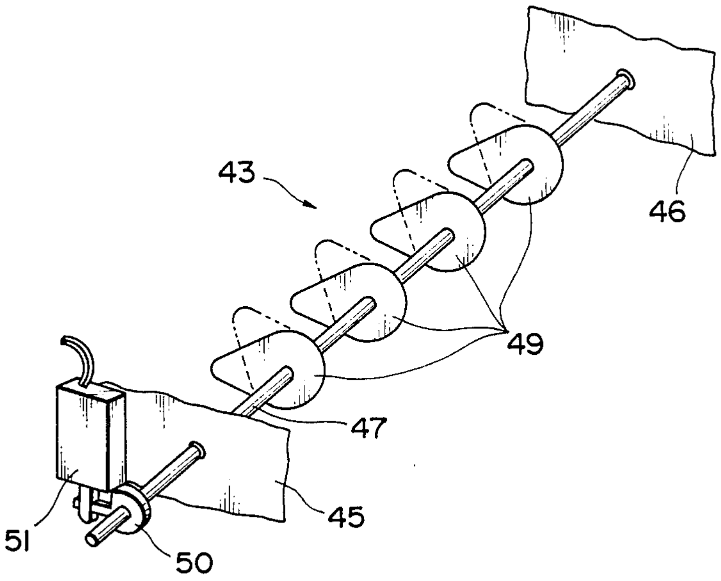
FIG. 5 is a perspective view illustrating a switching means.

The intermediate tray 40 has a main frame 41 which can be fixed by suitale means to the bottom of the main frame 3 of the copying apparatus 1. At an upper portion within the main apparatus 41, there is an inlet passage 42 to the intermediate tray 40 to receive smoothly the transfer sheet transported through the passage 33 from the sheet refeeding means having the flapper 29 or the like. A sheet passage switching means 43 is disposed at an inlet portion of the inlet passage 42, opposed to the passage 33. As shown in FIGS. 4 and 5, the transfer sheet switching means 43 includes a number of flapper elements 49 securedly fixed on a shaft 47 rotatably supported between front and rear plates 45 and 46 of the main frame 41. Further, adjacent one end of the shaft 47, an arm member 50 is fixed thereto and is swung by a solenoid 51 (control means). By the swing, as shown in FIGS. 3 and 5, the flappers 49 are switched between a first position indicated by the solid lines wherein the transfer sheet transported from the passage 33 is directed to the sheet transporting passage 23 and a second position indicated by broken lines wherein the transfer sheet conveyed through the passage 33 is introduced into the inlet passage 42. Adjacent the outlet part of the passage 42, there are provided a couple of discharging rollers 52 so as to positively discharge to the intermediate tray 53 the transfer sheet introduced to the inlet passage 42.

As shown in FIG. 4, above the intermediate tray 53, a sheet feeding roller 56 is provided to feeding the stacked sheet out of the intermediate tray 53. The refeeding roller 56 is supported by a shaft 55 which is supported by side plates 45 and 46 for vertical movement, and is controlled in its vertical position by unshown solenoid. Further, there are provided a couple of transportation rollers 57 and an outlet passage 56 in order to positively guide and transport the transfer sheet fed out by the refeeding roller 56, to the sheet passage 23.

The operation of the apparatus according to this embodiment will be described.

Figure 6:
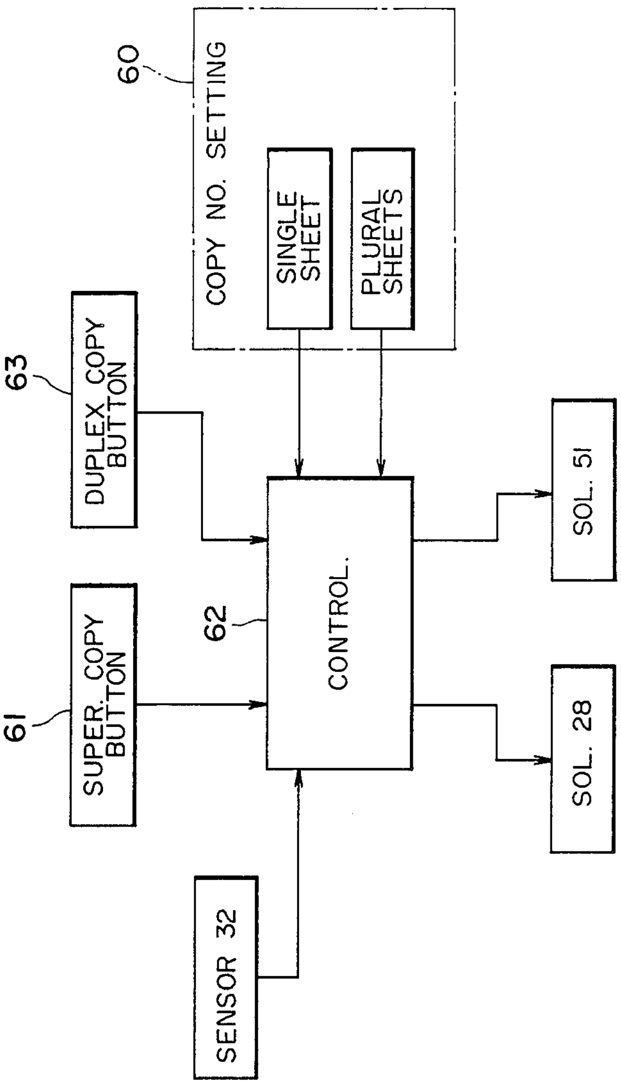
FIG. 6 is a block diagram illustrating the control of the apparatus.

In a single superimposing mode wherein only one superimposed copy is to be formed, the number of copies is set at 1 by the number button 60 as shown in FIG. 6, and a superimposed copy mode is selected by the button 51. Then, the solenoid 28 is energized to place the flapper 29 in its first position shown by the broken lines in FIG. 3, by an operation of a controlling device 62 built in the copying apparatus 39. On the other hand, the solenoid 51 is not energized, so that the flapper elements 49 of the switching means 43 takes the first position indicated by the solid lines in FIGS. 3 and 4. When the copying button is actuated, the transfer sheet fed out of the cassette 9*a* or 9*b* is transported to the copying station, where a toner image is transferred thereonto. The transfer sheet S is then passed through the image fixing station 25. The transfer sheet discharged from the fixing station 25 is conveyed by the discharging roller couple 26 along the right side of the flapper 29. Then, the sheet is conveyed through the passage 33 and the sheet transfer device 23 (sheet refeeding means) as shown by an arrow A in FIG. 3 and is refed to the copying station 2. Before being introduced to the copying station 2, the transfer sheet is once stopped by the lateral registration means 37 and then refed in response to the next copy starting signal.

In a single duplex mode where a single duplex copy is to be obtained, the number of the copies is set at 1 by the button 60, and the duplex copy mode selecting button 63 is depressed. In this case, neither of the solenoid 28 and the solenoid 51 is energized, and therefore, the flapper 29 takes the solid line position in FIG. 3, and the flapper elements 49 take the solid line position shown in FIGS. 3 and 5. When the copying operation starts, the transfer sheet having an image on one side thereof discharged by the discharging roller couple 26 is passed above the flapper 29. In response to the signal produced by the photosensor 32, the discharging roller couple 27 and the auxiliary flapper 30 effect the sheet switch back operation, and then, the transfer sheet is fed again to the copying station 2 through the passage 33 and the sheet transporting device 23.

In a repeated superimposing mode, wherein a plurality of the same image superimposed copies are to be obtained, the desired number of the copies is set by the number setting button 60, and a repeated superimposing copy selecting button 61 is actuated. As contrasted to the case where only one superimposed copy is to be obtained, the solenoid 28 is not energized so that the flapper 29 takes the position indicated by the solid line in FIG. 3, while the solenoid 51 is energized so that the flapper elements 49 tak the position shown by broken lines in FIG. 3 and 5. When the copying operation starts, the transfer sheet having been once subjected to the copying operation is switched back by the sheet refeeding means comprising the flapper 29 and the discharging roller couple 27 as in the single duplex copying mode. Then, it is introduced into the inlet passage 42 through the passage 33 along the arrow B in FIG. 3, whereby the transfer sheet is stacked face up on the intermediate tray 53. At the time of completion of the first copy, another original having the image to be superimposed is placed on the original supporting table 5, if necessary. Then, the copying operation resumes, and the sheet feeding roller 56 having been kept at the upper position away from the sheet on the intermediate tray is lowered to contact the topmost sheet on the intermediate tray 53. Simultaneously, the solenoid 51 is deenergized so that the flapper elements 49 are returned to the solid line position. The transfer sheet on the intermediate tray 53 is fed out of the intermediate tray 53 by the feeding roller 56 and is introduced into the copying station 2 through the transportation roller couple 57, the outlet passage 59 and the sheet transporting device 32. At this time, the sheet is once stopped by the lateral registration means 37 and corrected in its lateral deviation, and then immediately refed.

In a repeated duplex copying mode wherein plural number of duplex copy sheets are to be produced, the desired number is set by the number setting button 60, and the repeated duplex copy mode selecting button 63 is depressed. As contrasted to the single duplex mode operation, the solenoid 28 is energized so that the flapper 29 takes the broken line position shown in FIG. 3. The following operations are the same as those described with respect to the repeated superimposing copying operation with the exception that the transfer sheets are stacked on the intermediate tray 53 face down. Therefore, the detailed explanation is omitted for the sake of simplicity.

As for the sheet restarting signal once stopped by the lateral registration means 37, it may be produced in response to movement of the optical system or the original carriage. For example, two originals are juxtaposed on the original support, and the first image is copied, whereafter the sheet is started to refeed in response to the start of the exposure of the second original.

Figure 7:
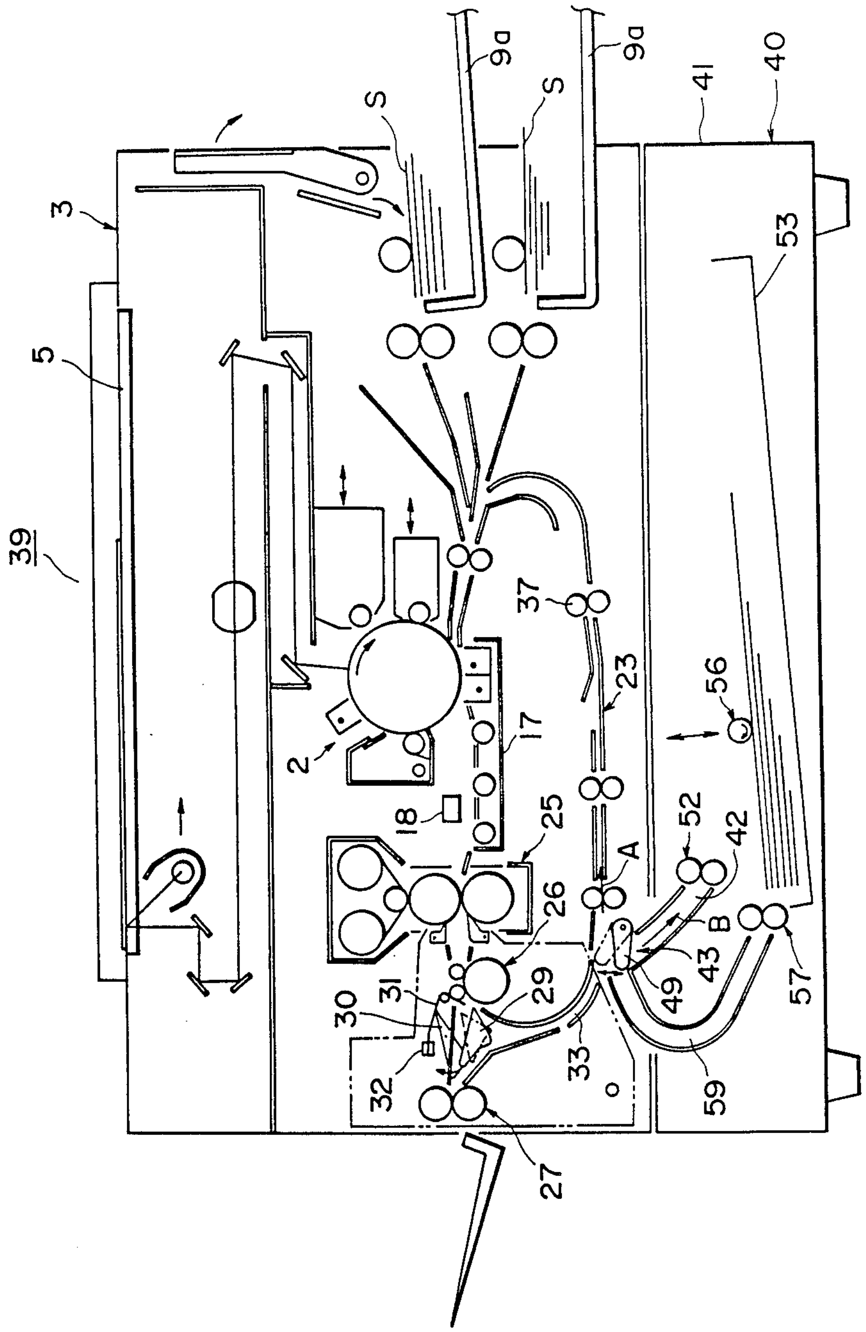
FIG. 7 is a sectional view of an image forming apparatus according to another embodiment of the present invention.

FIG. 7 shows another embodiment, which is the same as the embodiment of FIG. 3 with the exception that a transfer sheet passage sensor 18 is disposed in the transfer device 17. Therefore, the description will be made directly as to the operation.

In operation, in the single sheet superimposed copying operation, the number of the copies is set at 1 by the number setting button 60, and the superimposing copy mode selecting button is depressed. When the copy start button is actuated, the transfer sheet S fed out of the cassette 9*a* or 9*b* is conveyed to the copying sheet 2, where a toner image is transferred to the sheet. Then, the transfer sheet is conveyed to the image fixing station 25 by the transportation device 17. In the transporting device 17, the passage of the transfer sheet is detected by the transfer sheet passage sensor 18. The signal resulting from the sensing of the passage, is transmitted to a control device 62 built in the copying apparatus 39, and the solenoid 28 is energized, so that the flapper 29 is switched to the broken line position shown in FIG. 7. At this time, the solenoid 51 is not energized, and therefore, the flapper elements 49 of the transfer sheet passage switching means 43 are in the solid line position shown in FIG. 8. Accordingly, the transfer sheet, after being discharged from the image fixing device 25, is guided along the right side of the flapper 29 by the discharging roller couple 26. It is conveyed through the passage 33 and the sheet conveying device 23 in the path shown by an arrow A, and refed into the copying station 2.

In a single duplex copy mode, the number is set at 1 by the copy number setting button 60, and duplex copying mode selecting button 63 is depressed. In the operation in this mode, neither of the solenoid 28 or the solenoid 51 is energized even when the transfer sheet passaage sensor 18 senses the trasfer sheet, and therefore, the flapper 29 takes the solid line position shown in FIG. 8, and the flapper elements 49 taken the solid line position shown in FIG. 8. Accordingly, the transfer sheet which has received the toner image on its first side and which is discharged by the discharging roller couple 26 is guided above the flapper 29, and thereafter, it is subjected to the switch-back operation by the discharging roller couple 27 and the auxiliary flapper 30 on the basis of the signal from the photosensor 32. The sheet is then refed to the copying station 2 through the passage 33 and the sheet conveying device or passage 23.

In the repeated superimposed copy mode, the desired number of copies is set by the number setting button 60, and the superimposed copy mode selecting button 61 is depressed. The first transfer sheet which has received toner image in the copying station 2 is conveyed to the sheet conveying passage 23 by the sheet refeeding means exactly in the same manner as in the single sheet superimposed copy mode. The sheet is stopped by a lateral registration means 37 which is at rest at that time, and the sheet is kept there, and it waits for the second copying operation. When the second transfer sheet is detected by the transfer sheet passage sensor 18, the sense signal is transmitted to the control device. In this case, the solenoid 28 is not energized as contrasted to the case of the first sheet, whereby the flapper 29 takes the solid line position shown in FIG. 8, while the solenoid 58 is energized so that the flapper elements 98 of the transfer sheet switching means 43 take the broken line position shown in FIG. 8. Therefore, the second and the subsequent transfer sheets are, similarly to the case of the single duplex copy mode, are switched back by the sheet refeeding means including the flapper 29 or the like; and then, conveyed through the inlet passage 42 to the intermediate tray as indicated by an arrow B shown in FIG. 8; and subsequently, are stacked face up on the intermediate tray 53.

At the time of completion of the first copies for all of the transfer sheets, the original is exchanged as desired, and then, the copying operation is started. Firstly, the first sheet kept in the sheet conveying passage 23 is refed by the lateral registration means 37 into the copying station 2. Subsequently, the sheet feeding roller 56 having been kept at the upper position is lowered so as to contact the topmost transfer sheet on the intermediate tray 53. Simultaneously, the solenoid 51 is deenergized so that the flapper elements 49 are returned to the solid line position. The second and subsequent transfer sheets stacked on the intermediate tray 53 are sequentially picked up by the pick-up roller 57 and is introduced into the copying station 2 by the feeding roller 57 along the outlet passage 59 and the sheet transporting device 23.

In the repeated duplex copy mode, the desired number of copies is set by the number setting button 60, and the duplex copy mode selecting button 63 is selected. In this case, the first transfer sheet is, similarly to the previous case, is kept in the sheet conveying passage 23 waiting for the second copying operation. As for the second and subsequent transfer sheet, as contrasted to the case of the first sheet, the solenoid 28 is energized so that the flapper 29 takes the broken line position shown in FIG. 8. The subsequent operations are the same as in the repeated superimposed copy mode with the exception that the transfer sheets are stacked on the intermediate tray 53 face down.

According to this embodiment, the transfer passage for the transfer sheet is automatically switched, and the waiting period is reduced, so that the image forming operation becomes more efficient. Additionally, in the plural superimposed copy mode, the time required for the transportation of the transfer sheet is minimized, because the plural sheets are introduced into the image forming station very efficiently. In the single superimposed copy mode, the transfer sheet is automatically not introduced to the intermediate tray but directed to a sheet passage which has higher efficiency of sheet passage, and therefore, the waiting period is minimized in either of the plural sheets mode or in a single sheet mode, whereby the image formation efficiency is increased.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus for forming images on a sheet plural times, comprising:

an image forming station for forming an image;

sheet refeeding means for refeeding to said image formation station a sheet which has been subjected to an image forming operation of said image forming station;

sheet stacking means for stacking the sheet which has been subjected to the image forming operation of said image forming station for subsequent refeeding toward said image forming station; and displaceable switching means for selectively introducing the sheet to said sheet refeeding means and to said stacking means, wherein said stacking means includes tray means extending generally along a refeeding direction of the sheet for stacking a sheet introduced thereto by said switching means, feed means for feeding a sheet stacked on said tray means by advancing the sheet generally toward the direction from which the sheet was introduced to said tray means, and a sheet path for guiding the sheet fed by said feed means to said sheet refeeding means while inverting the facing orientation of the sheet.

2. An image forming apparatus for forming images on a sheet plural times, comprising:

an image forming station for forming an image;

sheet refeeding means for refeeding to said image forming station a sheet which has been subjected to an image forming operation of said image forming station when in a single mode, wherein plural image formations are effected on a single sheet;

sheet stacking means for stacking the sheet which has been subjected to the image forming operation of said image forming station for subsequent refeeding toward said imge forming station when in a repeating mode, wherein the plural image formations are effected on each of plural sheets; and displaceable switching means for selectively introducing the sheet to said sheet refeeding means and to said stacking means, wherein said stacking means includes tray means extending generally along a refeeding direction of the sheet for stacking a sheet introduced thereto by said switching means, feed means for feeding a sheet stacked on said tray means by advancing the sheet generally toward the direction from which the sheet was introduced to said tray means, and a sheet path for guiding the sheet fed by said feed means to said sheet refeeding means while inverting the facing orientation of the sheet.

3. An apparatus according to claim 2, wherein said sheet refeeding means includes a conveying roller for stopping the sheet and rotating in response to a conveying signal.

4. An image forming apparatus for forming images on a sheet plural times, comprising:

an image forming station for forming an image;

sheet refeeding means for refeeding to said image forming station a sheet which has been subjected to an image forming operation of said image forming station;

sheet stacking and feeding means for stacking the sheet which has been subjected to the image forming operation of said image forming station and subsequently refeeding the sheet toward said image forming station; and displaceable switching means for selectively introducing the sheet refeeding means and to said stacking means, wherein said sheet stacking and feeding means is a single, self-contained unit detachably mountable to a main assembly of the image forming apparatus containing said sheet refeeding means.

5. An apparatus according to claim 2, further comprising sheet inverting means for inverting the facing orientation of a sheet which has been subjected to the image forming operation of said image forming station and for introducing the sheet either to said sheet refeeding means or to said sheet stacking means.

6. An apparatus according to claim 2, further comprising transporting means for receiving the sheet which has been subjected to the image forming operation of said image forming station and for introducing the sheet without inverting its facing orientation either to said sheet refeeding means or to said sheet stacking means.

7. An apparatus according to claim 1, further comprising sheet inverting means for inverting the facing orientation of a sheet which has been subjected to the image forming operation of said image forming station and for introducing the sheet either to said sheet refeeding means or to said sheet stacking means, sheet transporting means for receiving the sheet which has been subjected to the image forming operation of said image forming station and introducing the sheet without inverting its facing orientation either to said sheet refeeding means or to said sheet stacking means, and switching means for selectively introducing the sheet to said sheet inverting means or to said sheet transporting means.

8. An apparatus according to claim 7, wherein said sheet refeeding means includes a sheet passage effective to invert the sheet in its facing orientation.

9. An apparatus according to claim 8, wherein the sheet is introduced to said sheet refeeding means through sheet reversing means when in a single superimposed mode, wherein the image forming operation is effected plural times on one side of a single sheet, and the sheet is introduced to said sheet stacking means through sheet transporting means without a sheet inverting function when in a repeated superimposed mode, wherein plural image formations are effected on one side of each of plural sheets.

10. An apparatus according to claim 8, wherein the sheet is introduced to said sheet refeeding means through sheet transporting means without inverting the sheet when in a single duplex mode, wherein a single duplex image is formed, and the sheet is introduced to said sheet stacking means through said sheet inverting means when in a repeated duplex mode, wherein plural duplex images are formed.

11. An image forming apparatus for forming images on a sheet plural times, comprising:

an image forming station for forming an image;

sheet refeeding means for refeeding to said image forming station a sheet which has been subjected to an image forming operation of said image forming station;

sheet stacking means for stacking the sheet which has been subjected to the image forming operation of said image forming station for subsequent refeeding toward said image forming station; and switching means for selectively introducing the sheet to said sheet refeeding means when in a single mode, wherein plural image forming operations are effected on a single sheet, and to said sheet stacking means when in a repeated mode, wherein the plural image forming operations are effected on each of plural sheets, wherein said stacking means includes tray means extending generally along a refeeding direction of the sheet for stacking a sheet introduced thereto by said switching means, feed means for feeding a sheet stacked on said tray means by advancing the sheet generally toward the direction from which the sheet was introduced to said tray means and a sheet path for guiding the sheet fed by said feed means to said sheet refeeding means while inverting the facing orientation of the sheet.

12. An apparatus according to claim 11, wherein said sheet refeeding means includes a conveying roller for stopping the sheet and rotating in response to a conveying signal.

13. An apparatus according to claim 4, wherein said switching means is contained in said unit.

14. An apparatus according to claim 11, further comprising sheet inverting means for inverting the facing orientation of a sheet which has been subjected to the image forming operation of said image forming station and for introducing the sheet either to said sheet refeeding means or to said sheet stacking means.

15. An apparatus according to claim 11, further comprising transporting means for receiving the sheet which has been subjected to the image forming operation of said image forming station and for introducing the sheet without inverting its facing orientation either to said sheet refeeding means or to said sheet stacking means.

16. An apparatus according to claim 11, further comprising sheet inverting means for inverting the facing orientation of a sheet which has been subjected to the image forming operation of said image forming station and for introducing the sheet either to said sheet refeeding means or to said sheet stacking means, sheet transporting means for receiving the sheet which has been subjected to the image forming operation of said image forming station and introducing the sheet without inverting its facing orientation either to said sheet refeeding means or to said sheet stacking means, and switching means for selectively introducing the sheet to said sheet inverting means or to said sheet transporting means.

17. An apparatus according to claim 4, wherein when images are to be formed on plural sheets, said switching means introduces the first sheet to said sheet refeeding means and introduces the second and subsequent sheets, if any, to said sheet stacking and feeding means.

18. An apparatus according to any one of claims 11, 12 and 14–16, wherein said sheet path is connected with said sheet refeeding means through said switching means.

19. An image forming apparatus for forming images on a sheet plural times, comprising:

an image forming station for forming an image;

sheet refeeding means for refeeding to said image forming station a first sheet which has been subjected to an image forming operation of said image forming station when in a repeated mode, wherein plural image forming operations are effected on each of plural sheets; and sheet stacking means for stacking a second and subsequent sheet, if any, which has been subjected to the image forming operation of said image forming station for subsequent refeeding toward said image forming station when in the repeated mode, wherein said stacking means includes tray means extending generally along a refeeding direction of the sheet for stacking a sheet introduced thereto by said switching means, feed means for feeding a sheet stacked on said tray means by advancing the sheet generally toward the direction from which the sheet was introduced to said tray means and a sheet path for guiding the sheet fed by said feed means to said sheet refeeding means while inverting the facing orientation of the sheet.

20. An apparatus according to claim 19, wherein said sheet refeeding means includes a conveying roller for stopping the sheet and rotating in response to a conveying signal.

21. An apparatus according to claim 4, wherein said sheet stacking and feeding means is used in a repeated mode wherein plural image formation is effected on each of plural sheets.

22. An apparatus according to claim 19, further comprising sheet inverting means for inverting the facing orientation of a sheet which has been subjected to the image forming operation of said image forming station and for introducing the sheet either to said sheet refeeding means or to said sheet stacking means.

23. An apparatus according to claim 19, further comprising transporting means for receiving the sheet which has been subjected to the image forming operation of said image forming station and for introducing the sheet without inverting its facing orientation either to said sheet refeeding means or to said sheet stacking means.

24. An apparatus according to claim 19, further comprising a sheet inverting means for inverting the facing orientation of a sheet which has been subjected to the image forming operation of said image forming station and for introducing the sheet either to said sheet refeeding means or to said sheet stacking means, sheet transporting means for receiving the sheet which has been subjected to the image forming operation of said image forming station and introducing the sheet without inverting its facing orientation either to said sheet refeeding means or to said sheet stacking means, and switching means for selectively introducing the sheet to said sheet inverting means or to said sheet transporting means.

25. An apparatus according to claim 24, wherein said sheet refeeding means includes a sheet passage effective to invert the sheet in its facing orientation.

26. An apparatus according to claim 25, wherein the sheet is introduced to said sheet refeeding means through sheet reversing means when in a single superimposed mode, wherein the image forming operation is effected plural times on one side of a single sheet, a first sheet is introduced to said sheet refeeding means through said sheet reversing means when in a repeated superimposed mode, wherein the plural image formations are effected on one side of each of plural sheets, the sheet is introduced to said sheet stacking means through sheet transporting means without a sheet inverting function when in the repeated superimposed mode, and second and subsequent sheets, if any, are introduced to said sheet stacking means through sheet transporting means without a sheet inverting function when in the repeated superimposed mode.

27. An apparatus according to claim 25, wherein the sheet is introduced to said sheet refeeding means through sheet transporting means without inverting the sheet when in a single duplex mode, wherein a single duplex image is formed, a first sheet is introduced to said sheet refeeding means through sheet transporting means without inverting the sheet when in a repeated duplex mode, wherein plural duplex images are formed, and the sheet is introduced to said sheet stacking means through said sheet inverting means when in the repeated duplex mode and second and subsequent sheets, if any, are introduced to said sheet stacking means through said sheet inverting means when in the repeated duplex mode.

28. An image forming apparatus for forming images on a sheet plural times, comprising:

an image forming station for forming an image;

sheet refeeding means for refeeding to said image forming station a sheet which has been subjected to an image forming operation of said image forming station;

sheet stacking means for stacking the sheet which has been subjected to the image forming operation of said image forming station for subsequent refeeding toward said image forming station; and switching means for introducing the first sheet to said sheet refeeding means and introducing the second and subsequent sheets, if any, to said sheet stacking means, wherein said stacking means includes tray means extending generally along a refeeding direction of the sheet for stacking a sheet introduced thereto by said switching means, feed means for feeding a sheet stacked on said tray means by advancing the sheet generally toward the direction from which the sheet was introduced to said tray means, and a sheet path for guiding the sheet fed by said feed means to said sheet refeeding means while inverting the facing orientation of the sheet.

29. An apparatus according to claim 28, wherein said sheet refeeding means includes a conveying roller for stopping the sheet and rotating in response to a conveying signal.

30. An apparatus according to claim 4, wherein said sheet stacking and feeding means includes tray means extending generally along a refeeding direction of the sheet for stacking a sheet introduced thereto by said switching means, feed means for feeding the sheet stacked on said stacking means by advancing the sheet generally in the direction from which the sheet was introduced to said tray means and a sheet path for guiding the sheet fed by said feed means to said sheet refeeding means while inverting the sheet the facing orientation of the sheet.

31. An apparatus according to claim 28, further comprising sheet inverting means for inverting the facing orientation of a sheet which has been subjected to the image forming operation of said image forming station and for introducing the sheet either to said sheet refeeding means or to said sheet stacking means.

32. An apparatus according to claim 28, further comprising transporting means for receiving the sheet which has been subjected to the image forming operation of said image forming station and for introducing the sheet without inverting its facing orientation either to said sheet refeeding means or to said sheet stacking means.

33. An apparatus according to claim 28, further comprising sheet inverting means for inverting facing orientation of a sheet which has been subjected to the image forming operation of said image forming station and for introducing the sheet either to said sheet refeeding means or to said sheet stacking means, sheet transporting means for receiving the sheet which has been subjected to the image forming operation of said image forming station and introducing the sheet without inverting its facing orientation either to said sheet refeeding means or to said sheet stacking means, and switching means for selectively introducing the sheet to said sheet inverting means or to said sheet transporting means.

34. An apparatus according to any one of claims 28, 29 and 31–33, further comprising a sensor for sensing passage of the sheet and effecting operation of said switching means.

35. An apparatus according to claim 30, further comprising sheet inverting means for inverting the facing orientation of a sheet which has been subjected to the image forming operation of said image forming station and for introducing the sheet either to said sheet refeeding means or to said sheet stacking and feeding means, and transporting means for receiving the sheet which has been subjected to the image forming operation of said image forming station and for introducing the sheet without inverting its facing orientation either to said sheet refeeding means or to said sheet stacking and feeding means.

36. An apparatus according to any one of claims 28, 29 and 31–33, wherein said sheet path is connected with said sheet refeeding means through said switching means.

37. An apparatus according to claim 35, wherein the sheet is introduced to said sheet refeeding means through sheet reversing means when in a single superimposed mode, wherein the image forming operation is effected plural times on one side of a single sheet, the sheet is introduced to said sheet stacking and feeding means through sheet transporting means without a sheet inverting function when in a repeated superimposed mode, wherein plural image formations are effected on one side of each of plural sheets, the sheet is introduced to said sheet refeeding means through said sheet transporting means without inverting the sheet when in a single duplex mode, wherein a single duplex image is formed, and the sheet is introduced to said sheet stacking and feeding means through said sheet inverting means when in a repeated duplex mode, wherein plural duplex images are formed.

38. An apparatus according to claim 8, wherein the sheet is introduced to said sheet refeeding means through sheet reversing means when in a single superimposed mode, wherein the image forming operation is effected plural times on one side of a single sheet, the sheet is introduced to said sheet stacking means through sheet transporting means without a sheet inverting function when in a repeated superimposed mode, wherein plural image formations are effected on one side of each of plural sheets, the sheet is introduced to said sheet refeeding means through sheet transporting means without inverting the sheet when in a single duplex mode, wherein a single duplex image is formed, and the sheet is introduced to said sheet stacking means through said sheet inverting means when in a repeated duplex mode, wherein plural duplex images are formed.

39. An apparatus according to claim 38, wherein further comprising a discharging roller reversible to switch back the sheet.

40. An apparatus according to claim 38, wherein said switching means is disposed for guiding the sheet from said sheet path to said sheet refeeding means.

41. An apparatus according to claim 18, wherein an inlet path to said tray means and an outlet path from said tray means intersect.

42. An apparatus according to claim 25, wherein the sheet is introduced to said sheet refeeding means through sheet reversing means when in a single superimposed mode, wherein the image forming operation is effected plural times on one side of a sheet single, a first sheet is introduced to said sheet refeeding means through said sheet reversing means when in a repeated superimposed mode, wherein the plural image formations are effected on one side of each of plural sheets, the sheet is introduced to said sheet stacking means through sheet transporting means without a sheet inverting function when in the repeated superimposed mode, wherein second and subsequent sheets, if any, are introduced to said sheet stacking means through sheet transporting means without a sheet inverting function when in the repeated superimposed mode, the sheet is introduced to said sheet refeeding means through sheet transporting means without inverting the sheet when in a single duplex mode, wherein a single duplex image is formed, a first sheet is introduced to said sheet refeeding means through said sheet transporting means without inverting the sheet when in a repeated duplex mode, wherein plural duplex images are formed and, the sheet is introduced to said sheet stacking means through said sheet inverting means when in the repeated duplex mode, and second and subsequent sheets, if any, are introduced to said sheet stacking means through said sheet inverting means when in the repeated duplex mode.

43. An apparatus according to claim 19, wherein the first sheet is temporarily stopped in said refeeding means, the second and subsequent sheets are stacked on said tray means of said sheet stacking means, and after all sheets are stacked thereon, the sheets are refed from the first sheet.

44. An apparatus according to claim 34, wherein said sensor senses passage of the first sheet.

45. An apparatus according to claim 34, wherein the first sheet is temporarily stopped in said sheet refeeding means, the second and subsequent sheets are stacked on said tray means, and after all sheets are stacked on said tray means, the sheets are refed from the first sheet.

* * * * *

UNITED STATES PATENT AND TRADEMARK OFFICE

CERTIFICATE OF CORRECTION

PATENT NO. : 4,777,498

DATED : October 11, 1988

INVENTOR(S) : TOSHIROU KASAMURA, ET AL.

It is certified that error appears in the above-identified patent and that said Letters Patent is hereby corrected as shown below:

On the Cover Page,

[56], "3,615,129 8/1968 Drawe et al. ......355/3" should read --3,615,129 10/1971 Drawe et al. ......355/3--;

Column 1, lines 49-50, "is refed" should be deleted;

line 63, "and" should read --or--.

Column 2, line 8, "have" should read --has--.

Column 3, line 8, "25," should read --25, are--;

line 15, "the" (second occurrence) should read --and--.

Column 4, line 6, "and therefore," should be deleted;

line 10, "suitale" should read --suitable--;

line 37, "to feeding" should read --to feed--;

line 43, "56" should read --59--.

Column 5, line 6, "where" should read --wherein--;

line 31, "tak" should read --take--;

line 55, "32" should read --23--.

CERTIFICATE OF CORRECTION

PATENT NO. : 4,777,498

DATED : October 11, 1988

INVENTOR(S) : TOSHIROU KASAMURA, ET AL.

Figure 8:
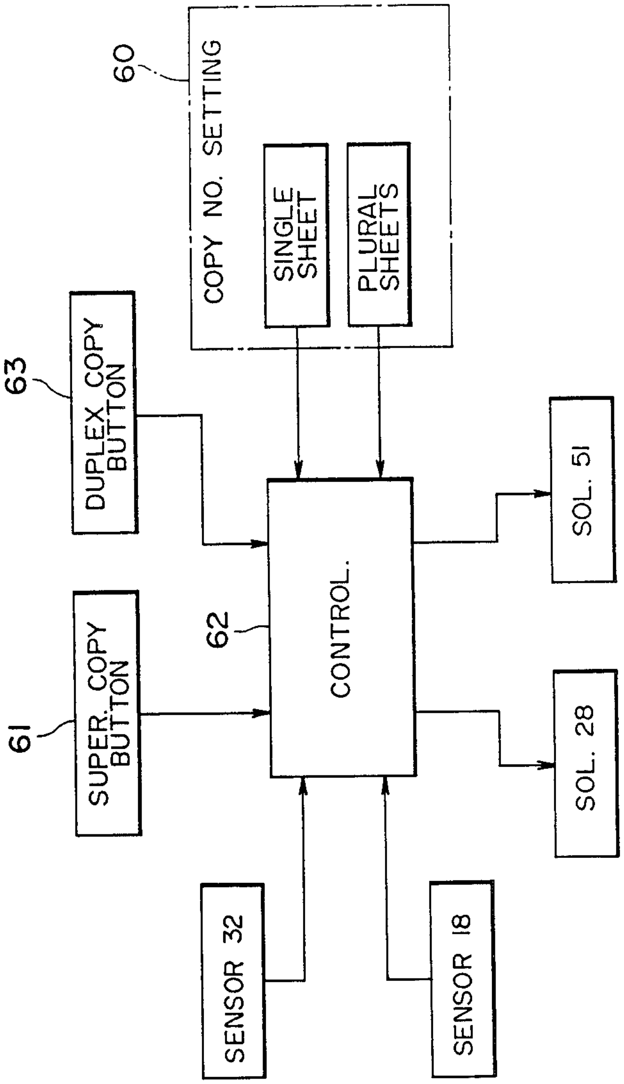
FIG. 8 is a block diagram for controlling the image forming apparatus shown in FIG. 7.

It is certified that error appears in the above-identified patent and that said Letters Patent is hereby corrected as shown below:

Column 6, line 18, "button" should read --button 61--;

line 20, "copying sheet 2" should read --copying station 2--;

line 33, "FIG. 8" should read --FIG. 7--;

line 44, "passa-" should read --pas- --;

line 45, "age" should read --sage--; same line, "trasfer" should read --transfer--;

line 46, "FIG. 8" should read --FIG. 7--;

line 48, "FIG. 8" should read --FIG. 7--.

Column 7, line 4, "FIG. 8" should read --FIG. 7--;

line 5, "58" should read --51--; same line, "flapper elements 98" should read --flapper elements 49--;

line 7, "FIG. 8" should read --FIG. 7--;

line 8, "are" should be deleted;

line 13, "FIG. 8" should read --FIG. 7--;

line 27, "is" should read --are--;

line 34, "is" should be deleted;

line 37, "sheet" should read --sheets--;

line 40, "8" should read --7--.

UNITED STATES PATENT AND TRADEMARK OFFICE

CERTIFICATE OF CORRECTION

PATENT NO. : 4,777,498

DATED : October 11, 1988

INVENTOR(S) : TOSHIROU KASAMURA, ET AL.

It is certified that error appears in the above-identified patent and that said Letters Patent is hereby corrected as shown below:

Column 8, line 67, "sheet refeeding" should read --sheet to said sheet refeeding--.

Column 12, line 49, "the" (second occurrence) should be deleted;

line 65, "facing" should read --the facing--.

Column 14, line 6, "wherein" should be deleted;

line 19, "sheet single" should read --single sheet--.

Signed and Sealed this

Eighth Day of August, 1989

*Attest:*

DONALD J. QUIGG

*Attesting Officer*

*Commissioner of Patents and Trademarks*